Feb. 21, 1961     R. SANTILLI     2,972,363
CENTERLESS DISC SAW WITH DEPTH OF CUT GREATER THAN THE RADIUS
Filed March 26, 1958     2 Sheets-Sheet 1
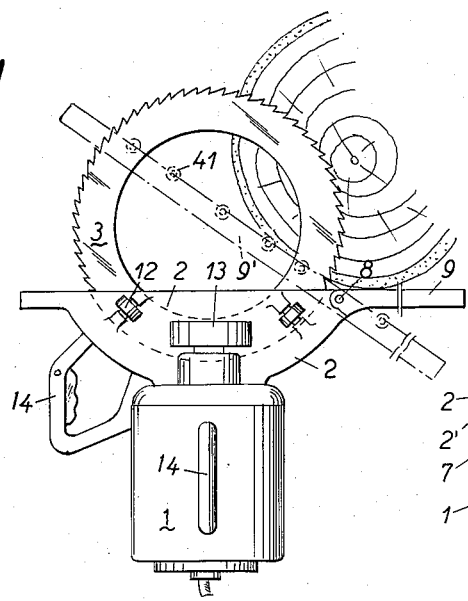
Fig.1
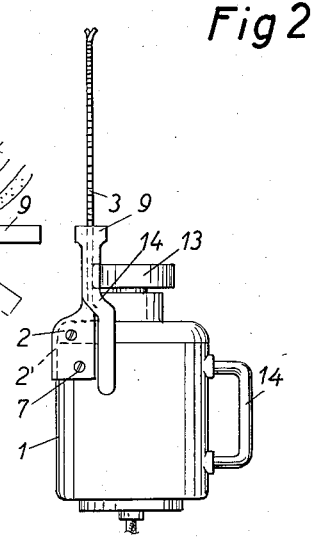
Fig 2
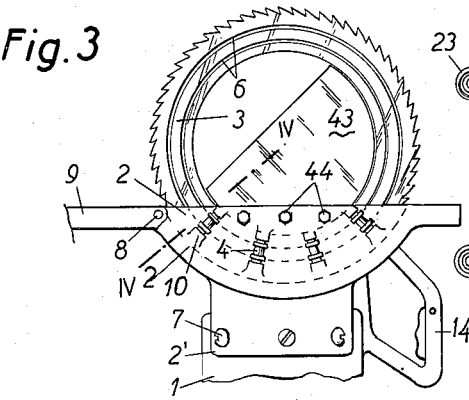
Fig.3
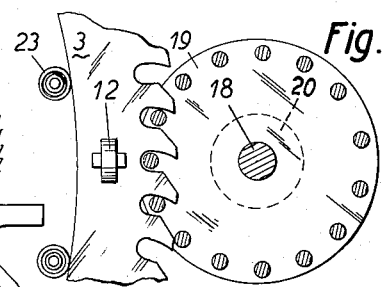
Fig.6
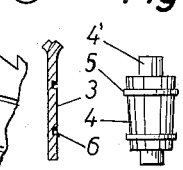
Fig.5
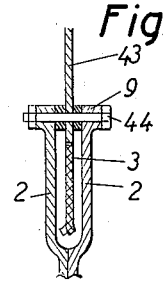
Fig.4
Fig.5a
Fig.5b
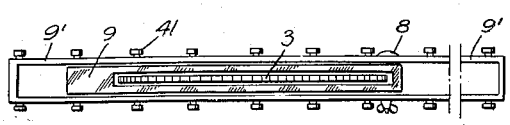
Fig.1a
INVENTOR.
Ruggero Santilli
BY
ATTORNEYS Feb. 21, 1961 R. SANTILLI 2,972,363
CENTERLESS DISC SAW WITH DEPTH OF CUT GREATER THAN THE RADIUS
Filed March 26, 1958 2 Sheets-Sheet 2
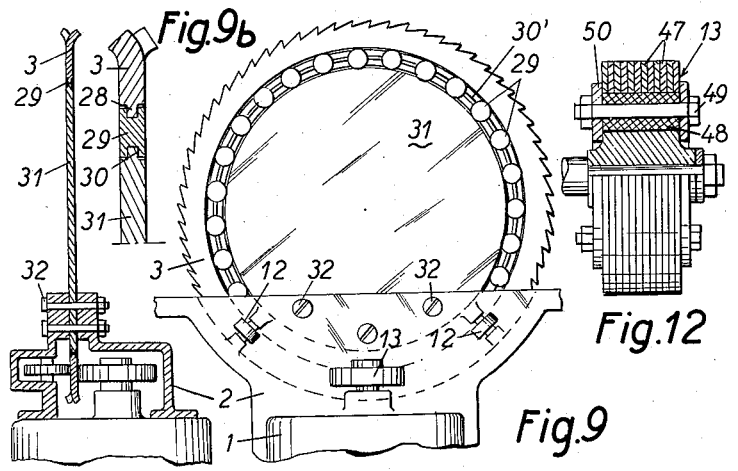
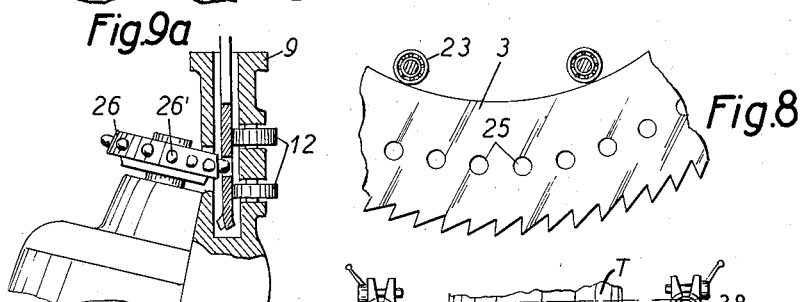
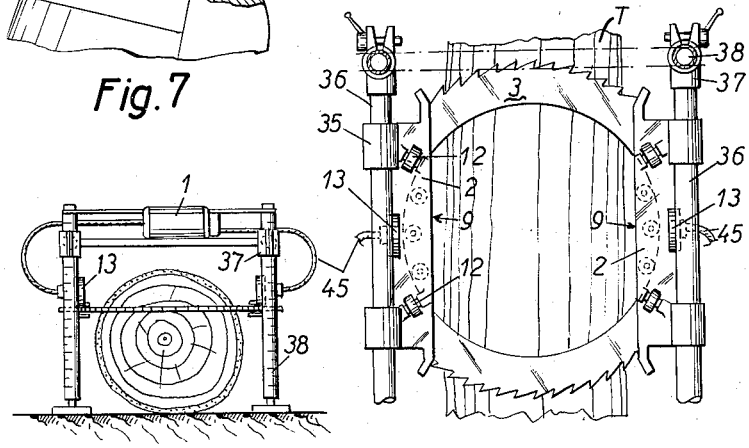
INVENTOR.
Ruggero Santilli
BY Richards & Geier
ATTORNEYS

# United States Patent Office 2,972,363
Patented Feb. 21, 1961

2,972,363

CENTERLESS DISC SAW WITH DEPTH OF CUT GREATER THAN THE RADIUS

Ruggero Santilli, Via Monforte 26, Campobasso, Italy

Filed Mar. 26, 1958, Ser. No. 724,116

Claims priority, application Italy May 9, 1957

4 Claims. (Cl. 143—44)

The object of the present invention is a disc saw driven by a mechanical friction or gear drive located in the peripherical portion of either or both faces of the disc, which is guided by a housing within which are mounted the drive and guide components.

The saw blade used does not differ substantially from the conventional solid-disc saw blades, but it can carry in its central part a hole of varying size, thus assuming the shape of a flat ring on the outer edge of which the cutting teeth are provided.

It is clear that, with such a device, the advantage is first of all obtained of having a depth of cut greater than that possible with the conventional disc saws, which is necessarily limited to the radius of the saw disc minus the radius of the parts used to fasten the disc on its shaft.

This basic concept of the invention is hereinafter explained in its feature and in some of its practical embodiments, presented as non-limiting examples and with reference to the enclosed tables of drawings.

In the tables:

Fig. 1 represents the machine as a whole, seen from one face of the saw;

Figure 1a is a top view of the machine shown in Fig. 1.

Fig. 2 is a side view of the same machine;

Fig. 3 is a view from the other face of the saw;

Fig. 4 is a partial cross-section of the machine along the IV—IV line of Fig. 3;

Fig. 5 represents a guide roller, and Figs. 5a and 5b a section of the grooved ring engaged by the edges of the guide rollers;

Fig. 6 shows another arrangement of the drive system;

Fig. 7 is a general view, in partial cross-section of the disc guide housing with the saw drive organs;

Fig. 8 represents a section of the saw with the drive holds and centering and guide bearings;

Figs. 9, 9a and 9b represent a modified system of saw centering and guiding;

Fig. 10 is a front view of the machine arranged to saw, for instance, wood planks for the entire length of a log;

Fig. 11 is a view of the same machine, from the above and on a larger scale;

Fig. 12 is a detail of a preferred form of saw drive friction roller.

With special reference to Figures 1 through 5, the machine comprises the motor housing 1 to which is fastened the guide housing 2, which occupies a sector of circle of suitable amplitude. Between the two facing walls of the guide housing runs the saw 3, which in this example is ring-shaped and is held on its plane of rotation by suitably tapered rollers 4, whose pivots 4' rotate in bearings 10 provided in the housing. The rollers have annular projections 5 which fit into grooves 6 in the saw ring or disc. The rollers may be replaced by fixed sectors of bearing metal, with edges fitting into the said grooves 6.

The guide housing 2, which in the example depicted is fastened to the motor housing by means of a flange 2' and screws 7, can be fixed to a cast projection of the motor housing, or be cast integrally with the latter. The housing offers to the part to be cut a support shoe 9, slotted to afford passage to the saw 3, and extending on either side of the latter.

As it is shown in Fig. 1, the shoe 9 carries a hinge 8, around which a second shoe 9' can be rotated to support the part to be cut and to limit the depth of cut. Preferably, from the surface of second shoe 9' rollers 41 project slightly to facilitate the sliding of the part to be cut.

On the face of the housing opposite to that on which guide rollers 4 are fitted, contrasting rollers 12 are mounted, which keep the saw blade running precisely on its plane. These rollers are fitted with a rim of suitable material (metal, alloy, fiber or the like) which rests against the crown of the saw blade 3, passing through openings in the housing surface 2. The rollers 12 may also be mounted inside the housing, as shown in Fig. 9a.

On the motor shaft is mounted drive wheel 13, fitted with a rim of fiber or like material, which ensures a good grip on the saw crown, or is specially shaped as described below. It should be noted in this connection that the driving action being exerted tangentially to the saw blade with a small lever arm as compared to the point of application of the resistance, the effort required to drive the saw is substantially reduced.

As indicated, Fig. 12 represents the details of one preferred form of friction roller 13. Upon the motor shaft 18 is fastened a hub, concentrically to which is mounted a stack of metal rings 47, which are not fitted directly over the hub, but with the interposition of a ring 48 of hard rubber or plastic. Bolts 49 pass through this ring of hard rubber or like material and clamp the stack of discs 47 by means of washers 50.

Thus, any small foreign bodies entering between the outer surface of the friction roller and the face of the saw would move one of the rings 47 without entirely moving away the roller 13 and interrupting the drive.

In the more general case the machine can be held and guided by hand using handles 14, also in view of its light weight, largely due to the small power required for its operation. There is nothing to prevent guides and supports from being fitted thereon particularly when logs are to be sawed into planks, as will be described below.

The following figures represent different embodiments of the principle described above. In these figures, the parts similar to those described above are identified with the same reference numbers.

In Fig. 6, where the housing is not shown, the disc saw 3 is driven into rotation by a gear 19 mounted on the motor shaft 18, and fitted with teeth capable of engaging the saw teeth.

The gear 19 instead of being fastened directly to the motor shaft 18, may be driven by a friction-disc device of known type, represented in Fig. 6 by the dotted circle 20. With the tangential-drive arrangement, the rollers 12 on both faces of the saw will not have a contrasting function, but will merely function as guides, while the thrust will be taken radially by bearings 23 mounted on the housing.

Figs. 7 and 8 represent another embodiment of the annular saw principle which forms an object of the invention. The saw is fitted with a plurality of round holes 25, spaced along a circumference marked on the annular band of the saw, and into these holes mesh the tapered teeth 26' of a special gear 26 fastened to the motor shaft.

The driving of the saw, instead of being effected by means of the gear 26 with teeth meshing with the holes 25, can be obtained by meshing of the said gear, moved forwards, with teeth on the inner edge of the annular saw 3. In this case, the guide rollers 4 and the contrast rollers 12 perform the same function as they had in the arrangements shown in Figures 1 through 5.

Figures 9, 9a, and 9b represent another variant. The saw 3 is annular-shaped and presents in the thickness of the inner edge a rib 28 (Fig. 9b) which fits into the groove provided in a crown of rollers 29 having the same thickness as the saw, and into which also fits a rib 30 of a disc 31 fastened to the housing by means of through bolts 32. The rollers are kept separate by means of spacers or cages 30', according to a known arrangement.

In Figs. 10 and 11 the machine is guided by two housings facing each other and fitted with sleeves 35 sliding on the horizontal ways 36. Since the two housings leave free the space comprised between the two pairs of shoes 9, it will be possible, for instance, to place a log T parallel and symmetrically to the said guides. In this case the machine is mounted bridge-fashion between the ways 36, the ends of which are fitted with sleeves 37 sliding on uprights 38, which may be fitted with graduated scales serving to fasten, at each cut, the ways 36 at the right height to cut successively the planks of the desired thickness. The motor 1, placed on the said bridge between the ways 36, drives two flexible shafts 45, each of which drives its own friction roller 13, and both drive the same saw.

In some cases, in order to stiffen the saw, instead of having it shaped as a solid disc, a steel disc 43 (Figs. 3 and 4) is placed inside the saw and on its same plane, and is fastened by through bolts 44 passing inside the housing cheeks or side plates.

Any changes in the machine described as may be intended to achieve the same results by applying the same inventive concept shall fall within the purview of the present invention, as defined in the following claims.

What I claim is:

1. A manually portable sawing machine having a housing, an annular saw blade partially located in said housing projecting outwardly therefrom and having its greater portion clear of the supporting means therefor to permit unobstructed cutting movement of the blade in the direction of said housing and along the latter, a motor fast with said housing, a driving shaft in said motor projecting towards the virtual axis of rotation of said annular blade and parallel with the plane of the latter and spaced from said plane, a drive wheel mounted on said shaft and engaging by its outer periphery one face of said annular blade for the purpose of frictionally driving the latter, a pair of smooth contrasting rollers carried by said housing contacting with said one face of said annular blade and arranged symmetrically with respect to said driving shaft and having their axes directed towards the virtual axis of rotation of said blade, the latter having in its other face a pair of concentric circular grooves, a number of tapered rollers provided with annular ribs fitting in said circular grooves, said rollers being rotatably supported by said housing and having their axes directed towards said virtual axis of rotation of said annular blade, one edge of said housing being a chord of said annular blade and being arranged substantially perpendicularly to said driving shaft.

2. A manually portable sawing machine having a housing, a disc blade having a virtual axis of rotation arranged in said housing and having its greater portion clear of said housing to permit unobstructed cutting movement of said blade towards said housing and along the latter, guiding means for said blade defining the position of its virtual axis of rotation with respect to said housing, said guiding means comprising a number of tapered rollers provided with spaced annular ribs engaging circular grooves provided in one face of said disc blade and rotatably supported at one side of said housing, driving and positioning means for said blade within said housing, said last mentioned means comprising a motor carried by said housing at the side of the latter opposite that supporting said tapered rollers, a driving shaft in said motor extending parallel with the plane of said disc blade towards the virtual axis of rotation of the latter, a drive wheel secured to said shaft and engaging by its smooth periphery the disc blade for frictionally driving the latter, and a pair of idle contrasting rollers supported by said housing at its side at which said motor is located arranged symmetrically with respect to said driving shaft and having their axes directed towards said virtual axis of rotation of said disc blade, said housing having one edge being a chord of said disc blade and extending substantially perpendicular with said driving shaft.

3. A manually portable sawing machine having a housing, a disc blade having a virtual axis of rotation arranged in said housing and having its greater portion clear of said housing to permit unobstructed cutting movement of said blade towards said housing and along the latter, guiding means for said blade defining the position of its virtual axis of rotation with respect to said housing, said guiding means comprising a number of tapered rollers provided with spaced annular ribs engaging circular grooves provided in one face of said disc blade and rotatably supported at one side of said housing, driving and positioning means for said blade within said housing, said last mentioned means comprising a motor carried by said housing at the side of the latter opposite that supporting said tapered rollers, a driving shaft in said motor extending parallel with the plane of said disc blade towards the virtual axis of rotation of the latter, a drive wheel secured to said shaft and engaging by its smooth periphery the disc blade for frictionally driving the latter, and a pair of idle contrasting rollers supported by said housing at its side at which said motor is located arranged symmetrically with respect to said driving shaft and having their axes directed towards said virtual axis of rotation of said disc blade, said housing having one edge being a chord of said disc blade and extending substantially perpendicular with said driving shaft, said one edge of said housing extending beyond said disc blade and forming a work-piece abutting shoe fixed to said housing and forming an extension of said disc blade chord.

4. A manually portable sawing machine having a housing, an annular saw blade having a virtual axis of rotation arranged in said housing and having its greater part clear of said housing to permit unobstructed cutting movement of the blade both in the direction of said housing and at right angles to the abovementioned direction, means for driving said saw blade, said means comprising a motor carried by said housing at one side thereof parallel with the plane of said saw blade, a driving shaft in said motor extending parallel with said plane of the saw blade towards the virtual axis of rotation of the latter, a drive wheel secured to the free end of said wheel and frictionally engaging said saw blade, means for guiding and positioning said saw blade in and with respect to said housing, said lastmentioned means comprising a pair of idle rollers supported in said housing for their axes to extend perpendicular to said saw blade and to be arranged symmetrically with respect to the plane containing the axis of said driving shaft and perpendicular to the plane of said saw blade, said rollers contacting the inner peripheral edge of said annular saw blade, said lastmentioned means further comprising idle rollers supported by said housing and arranged to contact the opposed faces of said saw blade and to have their axes directed towards the virtual axes of rotation of said blade, said housing having one edge being a chord of said saw blade and arranged substantially perpendicular to said driving shaft and extending beyond said saw blade to form a work-piece abutting shoe on the extension of said saw blade chord.

(References on following page)

References Cited in the file of this patent

UNITED STATES PATENTS

| | | |
|---|---|---|
| 973 | Grant | Oct. 8, 1838 |
| 158,671 | Brown et al. | Jan. 12, 1875 |
| 294,221 | Gorrell et al. | Feb. 26, 1884 |
| 368,618 | Proctor | Aug. 23, 1887 |
| 403,880 | Farwell | May 21, 1889 |
| 431,525 | Mattison | July 1, 1890 |
| 460,679 | Hammond | Oct. 6, 1891 |
| 651,652 | Davis | June 12, 1900 |
| 1,336,799 | Vaughan | Apr. 13, 1920 |
| 1,395,101 | Fite | Oct. 25, 1921 |
| 1,669,941 | Kennedy | May 15, 1928 |
| 2,490,255 | Chase | Dec. 6, 1949 |
| 2,770,036 | Anderson | Nov. 13, 1956 |
| 2,804,105 | Stone | Aug. 27, 1957 |

FOREIGN PATENTS

| | | |
|---|---|---|
| 11,293 | Great Britain | June 16, 1892 |
| 83,163 | Switzerland | Nov. 17, 1919 |
| 528,926 | Germany | July 6, 1931 |